United States Patent
Datz et al.

(10) Patent No.: US 8,802,015 B2
(45) Date of Patent: Aug. 12, 2014

(54) EXHAUST GAS CLEANING DEVICE, EXHAUST SYSTEM AND CLAMP CONNECTION

(75) Inventors: Wolfgang Datz, Tübingen (DE); Michael Krause, Albershausen (DE)

(73) Assignee: Eberspächer Exhaust Technology GmbH & Co. KG, Neunkirchen (DE)

(*) Notice: Subject to any disclaimer, the term of this patent is extended or adjusted under 35 U.S.C. 154(b) by 291 days.

(21) Appl. No.: 12/699,251

(22) Filed: Feb. 3, 2010

(65) Prior Publication Data

US 2010/0192541 A1    Aug. 5, 2010

(30) Foreign Application Priority Data

Feb. 5, 2009    (DE) .......................... 10 2009 007 391

(51) Int. Cl.
*B01D 50/00* (2006.01)
*F16L 17/00* (2006.01)

(52) U.S. Cl.
USPC .......................................... 422/177; 285/337

(58) Field of Classification Search
USPC ............. 422/177, 180; 60/274, 299; 285/365, 285/367
See application file for complete search history.

(56) References Cited

U.S. PATENT DOCUMENTS

| | | | |
|---|---|---|---|
| 1,863,122 A * | 6/1932 | Matthews | 220/4.07 |
| 3,398,978 A | 8/1968 | Gasche | |
| 4,185,858 A * | 1/1980 | Peash | 285/367 |
| 5,257,834 A | 11/1993 | Zeidler et al. | |
| 5,716,083 A | 2/1998 | Carr | |
| 2006/0053779 A1 | 3/2006 | Belisle et al. | |
| 2007/0090645 A1 | 4/2007 | Fadini et al. | |
| 2009/0021004 A1 | 1/2009 | Krause et al. | |

FOREIGN PATENT DOCUMENTS

| | | |
|---|---|---|
| DE | 24 59 661 A1 | 7/1976 |
| DE | 198 58 295 C1 | 8/2000 |
| EP | 2 017 516 A1 | 1/2009 |
| FR | 2 901 189 A1 | 11/2007 |
| GB | 1 114 653 A | 5/1968 |
| WO | WO 96/17199 A1 | 6/1996 |
| WO | WO 2005/043025 A1 | 5/2005 |

* cited by examiner

*Primary Examiner* — Tom Duong
(74) *Attorney, Agent, or Firm* — McGlew and Tuttle, P.C.

(57) ABSTRACT

An exhaust gas cleaning device (2) for an exhaust system (1) of an internal combustion engine with an exhaust gas cleaning element (7), which is arranged in a first tubular body (3), and with a second tubular body (4), to which the first tubular body (3) is detachably connected via a clamp connection (5). The clamp connection (5) includes a radially outwardly projecting first ring collar (8), formed at the first tubular body (3) and extending circumferentially in a closed form and a radially outwardly projecting second ring collar (9), formed at the second tubular body (4) and extending circumferentially in a closed form. A sealing ring (10) extends circumferentially in a closed form and is axially in contact with the first ring collar (8) and the second ring collar (9). A first ring body (11) is arranged on the outside at the first tubular body (3) and is axially in contact with the first ring collar on the side facing away from the sealing ring (10). A second ring body (12) is arranged on the outside at the second tubular body (4) and is axially in contact with the second ring collar (9) on the side facing away from the sealing ring (10). A clamp (13) extends over both the first ring body and said second ring body (11, 12) and tightens these axially towards one another.

20 Claims, 1 Drawing Sheet

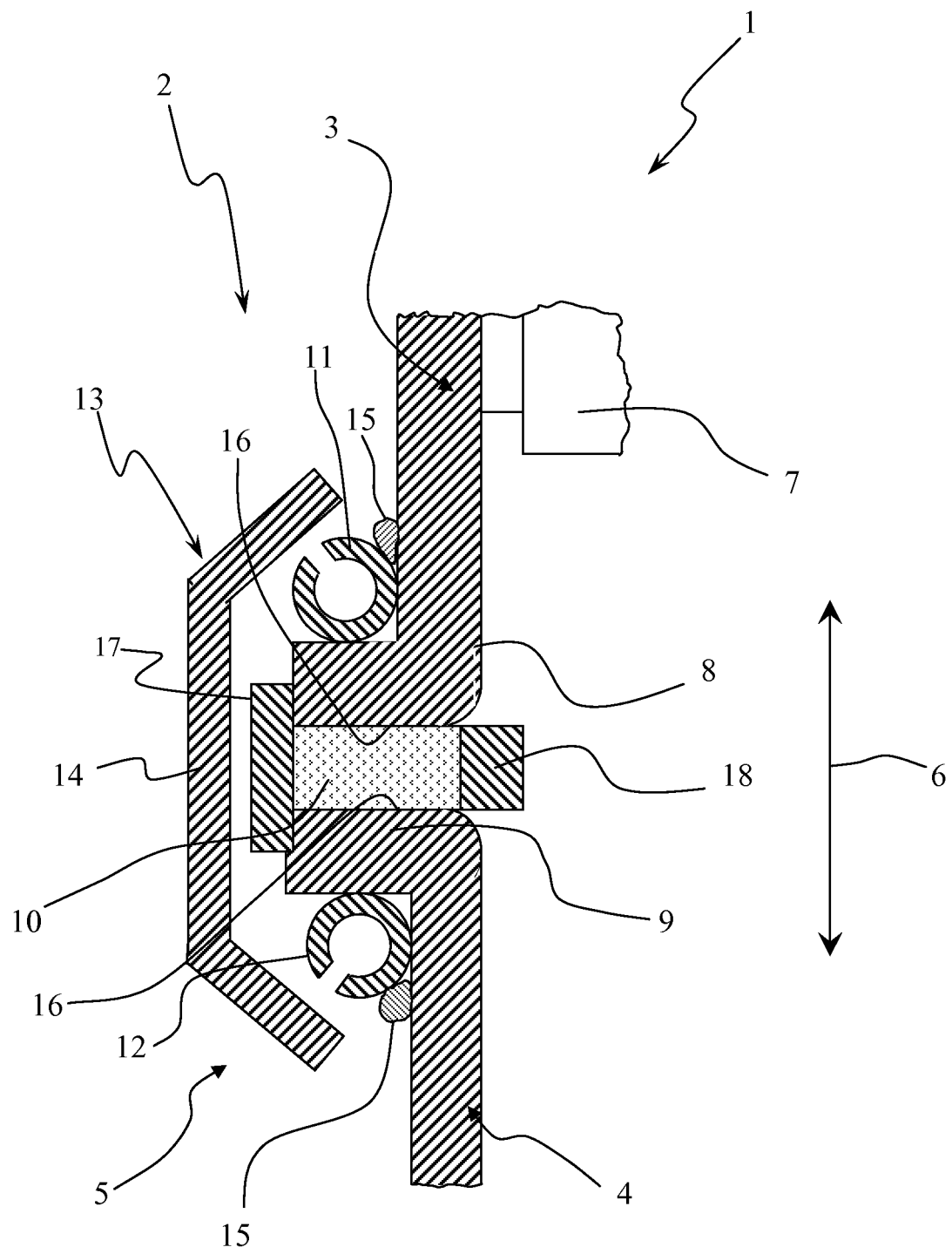

EXHAUST GAS CLEANING DEVICE, EXHAUST SYSTEM AND CLAMP CONNECTION

CROSS REFERENCE TO RELATED APPLICATIONS

This application claims the benefit of priority under 35 U.S.C. §119 of German Patent Application DE 10 2009 007 391.4 filed Feb. 5, 2009, the entire contents of which are incorporated herein by reference.

FIELD OF THE INVENTION

The present invention pertains to an exhaust gas cleaning device for an exhaust system of an internal combustion engine, especially of a motor vehicle. The present invention pertains, in addition, to an exhaust system equipped with such an exhaust gas cleaning device as well as to a clamp connection for use in such an exhaust system or in such an exhaust gas cleaning device.

BACKGROUND OF THE INVENTION

Exhaust systems of internal combustion engines usually contain a plurality of exhaust gas cleaning devices, for example, catalytic converters, particle filters and the like. It may be necessary in case of high mileages of the internal combustion engines equipped therewith to replace a cleaning element of such an exhaust gas cleaning device or to perform maintenance on it. For example, particle filters may become gradually clogged by noncombustible residues. Likewise, catalysts may be "worn out." To make possible such a replacement of individual cleaning elements, housing sections of the particular exhaust gas cleaning device can be attached to adjacent housing sections by means of quick-fastening means. By releasing these quick-fastening means, a housing section located between two other housing sections can thus be removed at right angles to the longitudinal direction of the housing. The cleaning elements on which maintenance is to be performed or which are to be replaced become readily accessible in this manner. The subsequent mounting also takes place again at right angles to the longitudinal direction of the housing with the use of the quick-fastening means. For example, quick connections, which are characterized by manufacturability at a low cost as well as by simple handling, are used as quick-fastening means for connecting tubular bodies. The relatively great manufacturing tolerances of the particular clamp, on the one hand, and of the housing sections to be connected thereto, on the other hand, are often problematic in such clamp connections. Such manufacturing tolerances can be extensively compensated, for example, by seals. However, the manufacturing tolerances frequently lead to asymmetrical loads on the seals, as a result of which these may become leaky over time. Undesirable pollutant emissions into the environment as well as excessive thermal loads on adjacent components may occur in case of leakage.

SUMMARY OF THE INVENTION

The present invention pertains to the object of providing an exhaust gas cleaning device or an exhaust system equipped therewith or a clamp connection as an improved embodiment, which is characterized especially in that it can be embodied at a relatively low cost and shall, in addition, guarantee a comparatively long service life for the clamp connection.

According to the invention, an exhaust gas cleaning device, an exhaust system and a clamp connection are provided. The clamp connection is for an exhaust gas cleaning device or exhaust system or similar construction with a first tubular body and a second tubular body an exhaust gas cleaning element may be arranged in the first tubular body. The clamp connection includes a radially outwardly projecting first ring collar, formed at the first tubular body and extending circumferentially in a closed form and a radially outwardly projecting second ring collar, formed at the second tubular body and extending circumferentially in a closed form. A sealing ring extends circumferentially in a closed form and is axially in contact with the first ring collar and the second ring collar. A first ring body is arranged on the outside at the first tubular body and is axially in contact with the first ring collar on the side facing away from the sealing ring. A second ring body is arranged on the outside at the second tubular body and is axially in contact with the second ring collar on the side facing away from the sealing ring. A clamp extends over both the first ring body and said second ring body and tightens these axially towards one another.

The present invention is based on the general idea of providing—on two tubular bodies, which shall be detachably connected to one another by means of a clamp connection—a radially outwardly projecting ring collar each, which are in contact with a common sealing ring on sides facing each other and at which the particular clamp is supported on sides facing away from each other via a separate ring body each. Such ring collars can be prepared on the tubular bodies at a comparatively low cost with relatively narrow tolerances. In addition, such ring bodies can be manufactured separately from the tubular bodies at a comparatively low cost with relatively narrow tolerances. There are correspondingly comparatively narrow tolerances within the clamp connection, as a result of which a relatively symmetrical or uniform load is obtained for the sealing ring. This has an advantageous effect for the sealing action and the service life of the sealing ring and hence of the clamp connection. Even though a plurality of individual parts must be used and installed in the clamp connection being proposed, this mode of construction can be embodied at a relatively low cost, and markedly narrower tolerances can be maintained at the same time.

Corresponding to an advantageous embodiment, the ring bodies can be fastened to the particular tubular body, doing so such that they are already in contact with the particular ring collar of the tubular body on the side facing away from the sealing ring. Removal and the later remounting are simplified due to the ring body being fixed to the tubular bodies, because the ring bodies remain at the mounting site intended therefor. Suitable fixations can be embodied now at a low cost, for example, by means of welded or soldered connections, especially in the form of weld points or soldering points.

According to another advantageous embodiment, the two ring collars can have a flat contact surface each, via which they are flatly in contact with the sealing ring. Due to the flat contact between the ring collars and the sealing ring, the axial pressing forces generated by means of the clamp are distributed over a large area, as a result of which the sealing ring as a whole is loaded with a comparatively low load and above all uniformly. On the one hand, the sealing action improves hereby. On the other hand, the service life of the sealing ring increases as a result.

In another advantageous embodiment the sealing ring may be provided radially inside with a protective ring extending circumferentially in the circumferential direction. The sealing ring can be protected by this protecting ring, for example, from a thermal load caused by the hot exhaust gases flowing in the tubular bodies, which likewise prolongs the service life of the sealing ring and hence of the entire clamp connection.

Other important features and advantages of the present invention appear from the drawings and from the corresponding description of the figures on the basis of the drawings. It is obvious that the above-mentioned features, which will also be explained below, can be used not only in the particular combination indicated, but in other combinations or alone as well, without going beyond the scope of the present invention.

Preferred exemplary embodiments of the present invention are shown in the drawings and will be explained in more detail below. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWING

In the drawing:
FIG. 1 shows a highly simplified schematic longitudinal section through an exhaust system within an exhaust gas cleaning device in the area of a clamp connection.

DESCRIPTION OF THE PREFERRED EMBODIMENTS

Referring to the drawing in particular, corresponding to FIG. 1, an exhaust system 1, which is shown here only partially, comprises at least one exhaust gas cleaning device 2, which is likewise shown only partially and which may be, for example, a catalytic converter or a particle filter. The exhaust system 1 is used to remove exhaust gases from an internal combustion engine, which may be arranged especially in a motor vehicle and preferably in a utility vehicle. To simplify or make possible the maintenance or replacement of at least one exhaust gas cleaning element 7 of the exhaust gas cleaning device 2 shown here only partially, at least two tubular bodies, namely, a first tubular body 3 and a second tubular body 4, are detachably connected to one another via a clamp connection 5 within the exhaust system 1 or within the exhaust gas cleaning device 2. The two tubular bodies 3, 4 extend, at least in the areas of the clamp connection 5, in parallel to a longitudinal direction or axial direction, which is indicated by a double arrow 6 in FIG. 1. The clamp connection 5 presses the two tubular bodies 3, 4 axially against each other. The aforementioned exhaust gas cleaning element 7, which may be, for example, a particle filter element or a catalytic converter element, is arranged in one of the two tubular bodies, here in the first tubular body 3. The first tubular body 3 may be connected at its two axial ends to another or second tubular body 4 via such a clamp connection 5 each. With the clamp connection 5 released, the first tubular body 3 can be removed at right angles to the longitudinal direction 6. The exhaust gas cleaning element 7 contained therein can be subjected to maintenance or replaced in a simple manner in this way. In particular, a complete unit comprising the first tubular body 3 and the exhaust gas cleaning device 7 inserted into it can be replaced. As an alternative, it is also possible to connect the second tubular body 4 at its two axial ends with such a clamp connection 5 each to another or first tubular body 3. By releasing the two clamp connections 5, the second tubular body 4 can then be removed at right angles to the longitudinal direction 6, as a result of which the particular exhaust gas cleaning element 7 arranged in the first tubular body 3 is readily accessible for maintenance purposes or for replacement.

The tubular bodies 3, 4 thus form especially housing sections of a housing of the exhaust gas cleaning device 2, not designated more specifically. The particular removable housing section, i.e., either the first tubular body 3 or the second tubular body 4, can be preferably connected via two such clamp connections 5 to adjacent housing sections.

The clamp connection 5 being shown here comprises a first ring collar 8, which is formed on the first tubular body 3 and which projects radially outwardly at one axial end of the first tubular body 3 and extends circumferentially in the circumferential direction in a closed form. Symmetrically thereto is formed a second ring collar 9, which projects radially outwardly at the respective axial end of the second tubular body 4 and extends circumferentially in the circumferential direction in a closed form. Furthermore, the clamp connection 5 comprises a sealing ring 10, which likewise extends circumferentially in the circumferential direction in a closed form, and which is in contact with both the first ring collar 8 and the second ring collar 9. The clamp connection 5 thus has only a single sealing ring 10, as a result of which it can be embodied at a comparatively low cost. Sealing ring 10 is located on sides of the ring collars 8, 9, which sides face each other and which can hereinafter also be called inner sides of the ring collars 8, 9.

Furthermore, the clamp connection 5 has a first ring body 11, which is arranged at the first tubular body 3 on a side of the first ring collar 8 facing away from the sealing ring 10. The sides of the ring collars 8, 9 facing away from each other or the sides of the ring collars 8, 9 facing away from the sealing ring 10 will hereinafter also be called outer sides. The first ring body 11 is correspondingly axially in contact with the outer side of the first ring collar 8. The two tubular bodies 3, 4 surround an interior space or an inner side each. The first ring body 11 is arranged at the first tubular body 3 on the outside, i.e., on the outer side thereof, and is in contact on the outside with the first tubular body 3. Analogously hereto, the clamp connection 5 comprises, besides, a second ring body 12, which is arranged on the outside at the second tubular body 4, namely, such that it is radially in contact with the outer side of the second tubular body 4 and is axially in contact with the outer side of the second ring collar 9.

The respective ring body 11, 12 extends in the circumferential direction and may be closed (in the circumferential direction—extending 360° around the respective tubular body). Likewise, a slotted or interrupted mode of construction is conceivable. For example, the particular ring body 11, 12 extends in the circumferential direction only over a range of at most 330° or at most 355°. Flexibility increases as a result, which improves tolerance compensation.

Finally, the clamp connection 5 also comprises a clamp 13, which is shaped such that it extends over the two ring bodies 11, 12 and braces them axially towards each other in the tightened state of clamp 13. Clamp 13 has a C-shaped or V-shaped profile here and can therefore also be called a V-clamp 13. Moreover, clamp 13 is band-shaped at least in one tightened area 14. This band-shaped tightened area 14 extends in the circumferential direction and can be tightened in the circumferential direction by means of a corresponding clamp closure, which is not shown here. Clamp 13 can correspondingly also be called a band clamp 13 and especially a V-band clamp 13.

The two ring bodies 11, 12 may be preferably fastened to the respective tubular body 3, 4. Corresponding fastening points or clamp fasteners are designated by 15 in FIG. 1. For example, these ring bodies 11, 12 may be fastened to the respective tubular body 3, 4 by at least one welded connection as the clamp fastener 15. A number of weld points located at spaced locations from one another in the circumferential direction are conceivable as well. As an alternative, a circumferential weld seam is also conceivable. It is likewise possible to embody the fastening points or clamp fasteners 15 by means of a soldered connection, which may likewise be punctiform or linear. The general flexibility increases and tolerance compensation is improved in the absence of fastening of the ring bodies 11, 12 to the respective tubular body 3, 4.

The two ring bodies 11, 12 may be formed by rolled round sections in the preferred embodiment being shown here. These are preferably rolled circular sections. Flat, band-shaped bodies are shaped for this by rolling into round sections or circular sections. Such profiled ring bodies 11, 12 are characterized by especially high stability; furthermore, they are lighter in weight and less expensive than solid bodies. In addition, they are elastic and can absorb an axial prestress and compensate tolerances as a result.

Corresponding to the preferred embodiment being shown here, the two ring collars 8, 9 are shaped such that their inner sides facing each other are flat and thus form flat contact surfaces 16, which are flatly in contact with one another in the mounted state. As a result, uniform axial load is obtained on the sealing ring 10. This leads to a uniform axial load on the sealing ring 10. The contact surfaces 16 extend in mutually parallel planes in the example, and these planes are, moreover, also oriented at right angles to the longitudinal direction 6. The assembly of the clamp connection 5 is simplified hereby.

In the example being shown, sealing ring 10 has at least one cross web 17 radially on the outside. This is supported at the ring collar 8, 9 radially on the outside. To do so, it extends over the sealing ring 10 in the axial direction on both sides. The ring seal 10 can be positioned by means of the cross web 17 at the ring collar 8, 9 during mounting and removal of the clamp connection 5. This simplifies the handling of the clamp connection 5. A plurality of such cross webs 17 may be arranged, in principle, at the sealing ring 10 distributed over the circumferential direction. It is likewise possible to provide a single band-shaped cross web 17, which will extend in the circumferential direction in this case. The cross webs 17 or the only band-shaped cross web 17 are/is preferably designed such that at most 180° of a section of the circumference of the sealing ring 10 is covered by the cross web 17 or is provided with the cross webs 17. As a result, sealing ring 10 can be removed in a simple manner at right angles to the longitudinal direction 6 even when only a slight axial motion is possible between the two tubular bodies 3, 4 with the clamp 13 removed. The respective cross web 17 is fastened to the sealing ring 10 in a suitable manner.

Corresponding to the embodiment being shown here, sealing ring 10 may have a protective ring 18 radially on the inside, which extends circumferentially in the circumferential direction. Protective ring 18 may consist, for example, of a material different from that of the sealing ring 10, for example, a metal or ceramic. Protective ring 18 may be designed as a heat-insulating ring. In addition or as an alternative, it may be made resistant to the corrosive atmosphere of the exhaust gases being conveyed in the exhaust system 1, especially resistant to oxidation. Moreover, protective ring 18 may be made temperature-resistant. This leads to effective protection of the sealing ring 10 against the corrosive environment in the interior of the tubular bodies 3, 4. The sealing ring 10 is preferably dimensioned in the radial direction such that the protective ring 18 is located in an area of the sealing ring 10 that is not braced axially with the clamp 13 mounted between the two ring collars 8, 9. In other words, the two ring collars 8, 9 are supported on the sealing ring 10 outside the protective ring 18. In particular, compression of the sealing ring 10 is possible as a result without the protective ring 18 between pressed between the ring collars 8, 9. Protective ring 18 is fastened to the sealing ring 10 in a suitable manner.

While specific embodiments of the invention have been described in detail to illustrate the application of the principles of the invention, it will be understood that the invention may be embodied otherwise without departing from such principles.

What is claimed is:

1. An exhaust gas cleaning device for an exhaust system of a vehicle internal combustion engine, the exhaust gas cleaning device comprising:
    a first tubular body;
    an exhaust gas cleaning element arranged in said first tubular body;
    a second tubular body, said first tubular body and said second tubular body receiving a flow of exhaust gas; and
    a clamp connection, said first tubular body being detachably connected to said second tubular body via said clamp connection, said clamp connection comprising:
    a first ring collar formed at the first tubular body, said first ring collar projecting radially outwardly;
    a second ring collar formed at the second tubular body, the second ring collar projecting radially outwardly and extending circumferentially;
    a circumferentially closed sealing ring axially in contact with said first ring collar and with said second ring collar, said sealing ring being exposed to said flow exhaust gas;
    an outer first ring body arranged at said first tubular body and axially in contact with said first ring collar on a side facing away from said sealing ring;
    an outer second ring body arranged at said second tubular body and axially in contact with said second ring collar on a side facing away from said sealing ring, said outer first ring body and said outer second ring body being interrupted in a circumferential direction; and
    a clamp extending over said first ring body and said second ring body and acting on said first ring body and said second ring body for tightening said first ring body and said second ring body axially towards each other.

2. An exhaust gas cleaning device in accordance with claim 1, further comprising:
    a cross web, wherein the sealing ring carries said cross web radially outwardly, said cross web being radially supported radially outwardly by said first ring collar and said second ring collar, said cross web having an inner cross web surface, said inner cross web surface extending continuously, without interruption, from said first ring collar outer surface to said second ring collar outer surface, wherein said inner cross web surface is in direct contact with said first ring collar, said second ring collar and said sealing ring, wherein said first ring body and said second ring body are fastened to the respective first tubular body and second tubular body, said first ring collar comprising a first ring collar outer surface, said first ring collar outer surface being parallel to a longitudinal axis of said first tubular body, said second ring collar comprising a second ring collar outer surface, said second ring collar outer surface being parallel to said longitudinal axis.

3. An exhaust gas cleaning device in accordance with claim 2, further comprising:

a first fastener, wherein said first ring body is connected to said first tubular body by said first fastener; and a second fastener, wherein said second ring body is connected to said second tubular body by said second fastener.

4. An exhaust gas cleaning device in accordance with claim 2, wherein each of said first ring collar and said second ring collar has a flat contact surface flatly in contact with said sealing ring, said first ring collar outer surface being perpendicular to said flat contact surface of said first ring collar and said second ring collar outer surface being perpendicular to said flat contact surface of said second ring collar, said first ring collar outer surface being a first ring collar outer flat surface and said second ring collar outer surface being a second ring collar outer flat surface, said inner cross web surface being a flat inner cross web surface, said flat inner cross web surface extending in a direction parallel to a flow of exhaust, said cross web being perpendicular to said flat contact surface of said first ring collar and said flat contact surface of said second ring collar, at least a portion of said cross web being supported by said sealing ring.

5. An exhaust gas cleaning device in accordance with claim 2, further comprising at least one additional cross web wherein a plurality of cross webs are arranged distributed in the circumferential direction at the sealing ring.

6. An exhaust gas cleaning device in accordance with claim 2, wherein said cross web is a single band-shaped cross web extending in a circumferential direction.

7. An exhaust gas cleaning device in accordance with claim 1, wherein said first ring body and said second ring body are loosely in contact with the respective tubular body.

8. An exhaust gas cleaning device in accordance with claim 1, wherein said first ring body and said second ring body are formed by rolled round sections or rolled circular sections.

9. An exhaust gas cleaning device in accordance with claim 1, wherein said sealing ring has an inner radial side protective ring extending in the circumferential direction.

10. An exhaust gas cleaning device in accordance with claim 9, wherein said protective ring comprises a heat-insulating and/or oxidation-resistant and/or temperature-resistant protective ring, said protective ring being in contact with said flow of exhaust gas, said protective ring being formed of a material that is different from a material of said sealing ring.

11. An exhaust gas cleaning device in accordance with claim 9, wherein said protective ring is arranged in an area of said sealing ring, which is not braced axially between the ring collars with the clamp connected.

12. A clamp connection in accordance with claim 1, wherein:

said sealing ring has an inner radial side protective ring extending in the circumferential direction;

said protective ring comprises a heat-insulating and/or oxidation-resistant and/or temperature-resistant protective ring, said protective ring being in contact with a flow of exhaust gas through one or more of the first tubular body and the second tubular body, said protective ring being formed of a material that is different from a material of another portion of said sealing ring; and said protective ring is arranged in an area of said sealing ring, which is not braced axially between the ring collars with the clamp connected.

13. A clamp connection for detachably connecting a first tubular body to a second tubular body for an exhaust system or an exhaust gas cleaning device, the clamp connection comprising:

a first ring collar formed at the first tubular body, said first ring collar projecting radially to the outside and extending circumferentially in a closed form;

a second ring collar formed at the second tubular body, said second ring collar projecting radially to the outside and extending circumferentially in a closed form;

a sealing ring extending circumferentially in a closed form and axially in contact with said first ring collar and with said second ring collar, at least a portion of said sealing ring, said first tubular body and said second tubular body defining an interior space, said interior space receiving an exhaust fluid flow, said at least said portion of said sealing ring being in contact with said exhaust fluid flow;

a first ring body arranged on an outside at said first tubular body and axially in contact with said first ring collar on a side facing away from said sealing ring, said first ring body having a first ring body first end and a first ring body second end, said first ring body first end and said first ring body second end defining a first ring body space;

a second ring body arranged on an outside at said second tubular body and axially in contact with said second ring collar on a side facing away from said sealing ring, said second ring body having a second ring body first end and a second ring body second end, said second ring body first end and said second ring body second end defining a second ring body space; and a clamp extending over said first ring body and said second ring body and tightening said first ring body and said second ring body axially towards each other.

14. A clamp connection in accordance with claim 13, further comprising:

a cross web having a first end portion and a second end portion, said first end portion engaging said first ring collar to define a first cross web connection point, said second end portion engaging said second ring collar to define a second cross web connection point, said cross web extending continuously, without interruption, from said first cross web connection point to said second cross web connection point, said sealing ring engaging said cross web;

a first fastener, wherein said first ring body is connected to said first tubular body by said first fastener;

a second fastener, wherein said second ring body is connected to said second tubular body by said second fastener.

15. A clamp connection in accordance with claim 14, wherein each of said first ring collar and said second ring collar has a flat contact surface flatly in contact with said sealing ring.

16. A clamp connection in accordance with claim 15, wherein said cross web is perpendicular to said flat contact surface said first ring collar and said second ring collar, said first ring collar and said second ring collar comprising an outer flat contact surface extending in parallel to a longitudinal axis of the first tubular and the second tubular body, said outer flat contact surface being perpendicular to flat contact surface.

17. A clamp connection in accordance with claim 13, wherein said first ring body and said second ring body are loosely in contact with the respective tubular body.

18. A clamp connection in accordance with claim 13, wherein said first ring body and said second ring body are formed by rolled round sections or rolled circular sections.

19. An exhaust system for an internal combustion engine, the system comprising:

an exhaust gas cleaning device;

a first tubular body;
an exhaust gas cleaning element arranged in said first tubular body;
a second tubular body;
a first ring collar formed at the first tubular body, said first ring collar projecting radially to the outside and extending circumferentially in a closed form;
a second ring collar formed at the second tubular, said second ring collar projecting radially to the outside and extending circumferentially in a closed form;
a sealing ring extending circumferentially in a closed form and axially in contact with said first ring collar and with said second ring collar, said sealing ring comprising a protective ring, said protective ring being in contact with an exhaust fluid flow, said protective ring being formed of a material that is different from another portion of said sealing ring; and
a first ring body arranged on an outside at said first tubular body and axially in contact with said first ring collar on a side facing away from said sealing ring, said first ring body comprising a first ring body circumferential surface, said first ring body circumferential surface defining a first ring body opening;
a second ring body arranged on an outside at said second tubular body and axially in contact with said second ring collar on a side facing away from said sealing ring, said second ring body comprising a second ring body circumferential surface, said second ring body circumferential surface defining a second ring body opening;
a clamp extending over said first ring body and said second ring body and tightening said first ring body and said second ring body axially towards each other.

20. An exhaust system in accordance with claim 19, further comprising:
a clamp web having an inner surface extending continuously, without interruption, from a portion of said first ring collar to a portion of said second ring collar, wherein said first ring collar, said second ring collar and said sealing ring are in direct contact with said inner surface, said clamp web being perpendicular to said first ring collar and said second ring collar, said cross web having a cross web portion extending between said first ring collar and said second ring collar, said protective ring comprising one or more of a heat-insulating protective ring, an oxidation-resistant protective ring and a temperature-resistant protective ring, said protective ring being in contact with a flow of exhaust gas through one or more of said first tubular body and said second tubular body.

* * * * *